Oct. 14, 1969   C. VAN DER LELY   3,472,235
THRESHING MACHINES

Filed March 7, 1966   3 Sheets-Sheet 1

INVENTOR
CORNELIS VAN DER LELY
BY
Mason, Mason & Albright
Attorneys

Oct. 14, 1969     C. VAN DER LELY     3,472,235
THRESHING MACHINES

Filed March 7, 1966     3 Sheets-Sheet 2

INVENTOR
CORNELIS VAN DER LELY
BY
Mason, Mason & Albright
Attorneys

Oct. 14, 1969   C. VAN DER LELY   3,472,235
THRESHING MACHINES
Filed March 7, 1966   3 Sheets-Sheet 2

INVENTOR
CORNELIS VAN DER LELY
BY
Mason, Mason & Albright
Attorneys

United States Patent Office 3,472,235
Patented Oct. 14, 1969

3,472,235
THRESHING MACHINES
Cornelis van der Lely, 7 Bruschenrain,
Zug, Switzerland
Filed Mar. 7, 1966, Ser. No. 532,305
Claims priority, application Netherlands, Mar. 18, 1965,
6503423
Int. Cl. A01f 7/04, 12/00
U.S. Cl. 130—27                          8 Claims

ABSTRACT OF THE DISCLOSURE

A combine harvester having a threshing mechanism for processing cut crop and conveyors for moving the crop through the housing of the harvester. A supervisory station is located adjacent the driver's seat so that the operator can view processed crop as it is being moved through the conveyor.

---

This invention relates to a threshing machine, or a machine, such as a combine harvester, including a threshing mechanism. Both such machines are to be included in the term "a threshing machine of the kind set forth."

In accordance with the invention there is provided a threshing machine of the kind set forth comprising a checking device for conveying threshed product unthreshed and partially threshed crop, which has passed through the machine, to a supervisory station at which the state of such crop can be checked, the device comprising a housing and a conveyor within said housing adapted to cooperate with a wall of the housing for conveying such crop to said supervisory station.

Figure 1:
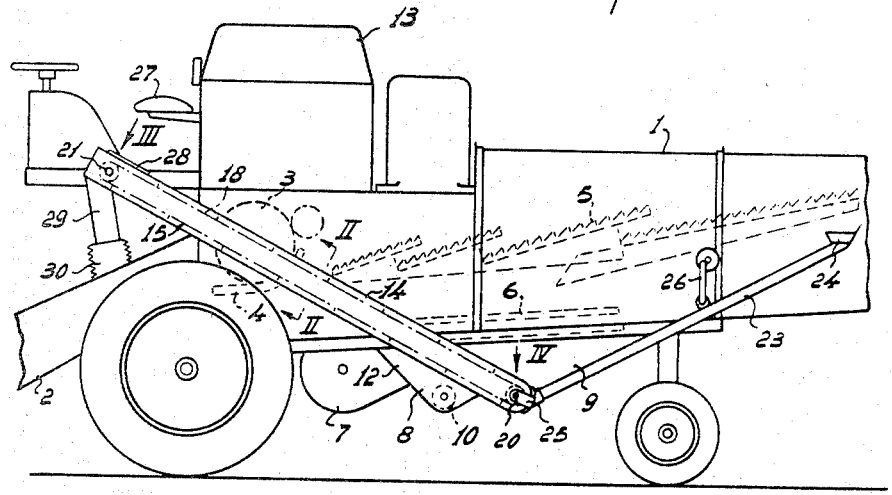
Figure 2:
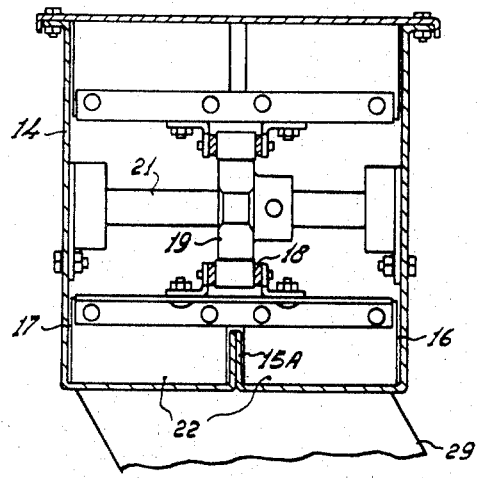
Figure 3:
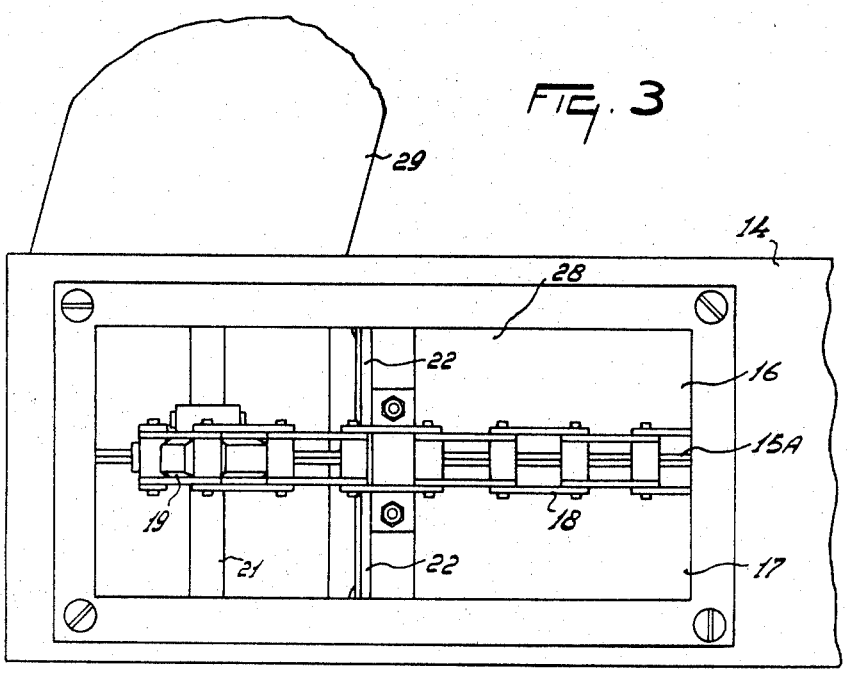
Figure 4:
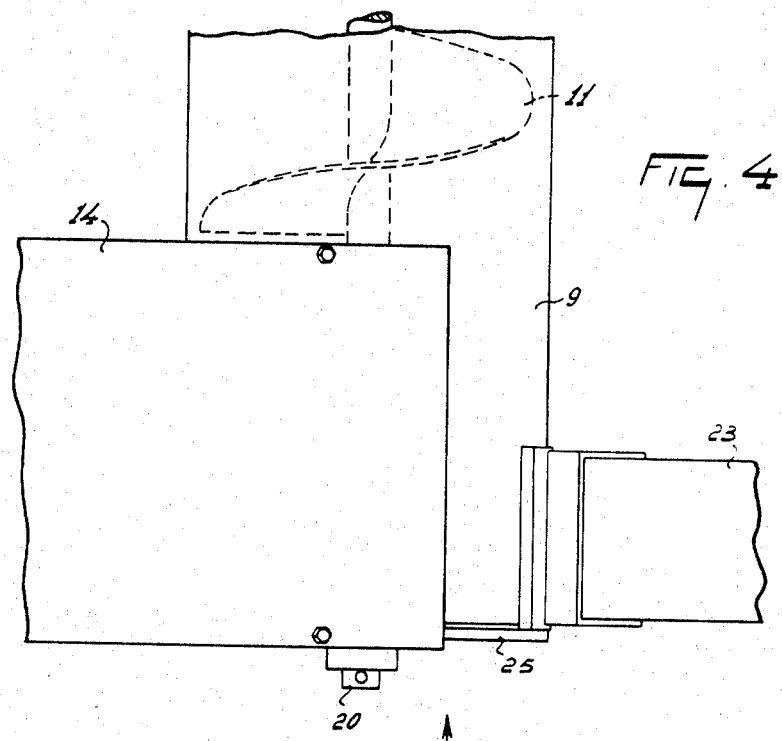
Figure 5:
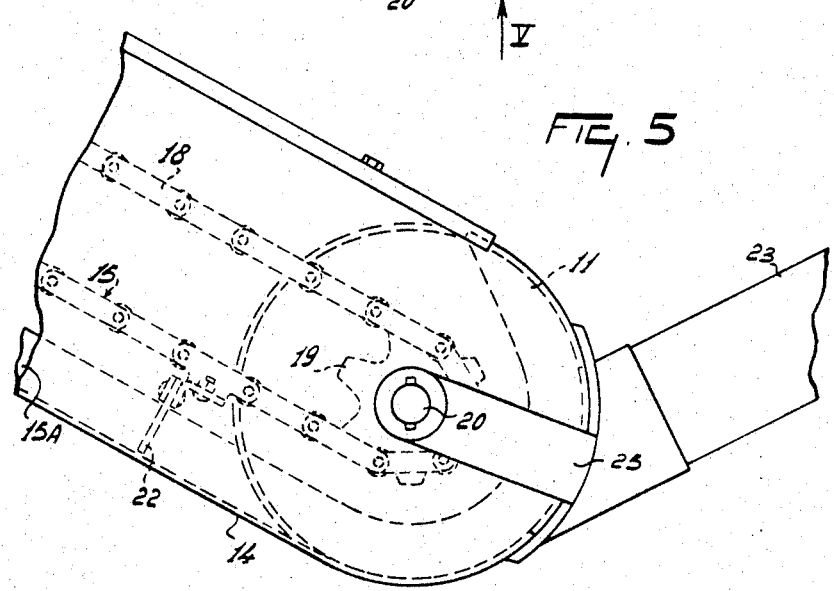

For a better understanding of the invention and the method by which the same can be performed, reference will now be made, by way of example, to the accompanying drawings, in which:

FIG. 1 is a diagrammatic side view of part of a combine harvester including a threshing machine in accordance with the invention, FIG. 2 is a sectional view, to an enlarged scale, taken on the line II—II in FIG. 1, FIG. 3 is a view, to an enlarged scale, taken in the direction of the arrow III in FIG. 1, FIG. 4 is a scrap view, to an enlarged scale, taken in the direction of the arrow IV in FIG. 1, and FIG. 5 is a view taken in the direction of the arrow V in FIG. 4.

Referring now to the drawings, there is shown a threshing machine forming part of a combine harvester. The combine harvester is self-propelled and is shown for the major part only diagrammatically. The combine harvester is of conventional type in that the mowing platform, elevator and threshing mechanism are of known type. At the front of the combine harvester, with respect to the intended direction of operative travel, there is arranged a mowing platform (not shown) which is carried by an upwardly extending elevator portion 2 which is mounted on the frame 1 of the combine harvester for upward and downward movement relative thereto. The upper side of the elevator 2 opens out to a threshing drum 3 rotatably mounted on the frame and cooperating with a thresher concave 4 arranged below the drum 3. A separating and cleaning mechanism is arranged behind the drum 3 and comprises a plurality of vibratable shakers 5, sieves 6 arranged below the shakers 5, and a fan 7.

Collecting means in the form of transversely extending troughs 8 and 9 are arranged below the sieves 6 and augers 10 and 11 are aranged respectively in the troughs 8 and 9 and extend transversely of the longitudinal center line of the threshing machine and combine harvester. The auger 10 in the trough 8 cooperates with a conveyor in a housing 12 which extends upwardly therefrom to open out into a tank 13 arranged on the upper side of the frame.

The collecting trough 9, located rearwardly of the trough 8, communicates with a checking device for returning unthreshed and partially threshed crop for further treatment by the machine. The device comprises a housing 14 which extends upwardly and forwardly from the trough 9 to near the front of the combine harvester and encloses an endless conveyor 15. Referring to FIG. 2, it will be seen that the housing 14 is divided into two compartments 16 and 17 by an upright partition 15A which is fastened to the bottom wall of the housing 14 and extends parallel to the longitudinal axis of the housing. The partition 15A extends substantially throughout the length of the housing 14 from near the connection of the housing 14 with the trough 9 up to the upper end of the housing 14. The conveyor 15 inside the housing 14 comprises an endless conveyor chain 18 which is taken over sprockets 19, one sprocket 19 being mounted on a shaft 20 at the lower end of the housing 14 and the other sprocket 19 being arranged near the upper end of the housing 14 on a shaft 21. The shaft 20 for the auger 11 within trough 9 can be driven through a conventional transmission arrangement. The shaft 20 is journalled in the side walls of housing 14 near its upper ends.

As seen in FIG. 1, the conveyor chain 18 is located midway between the side walls of the housing 14 and is provided with equidistantly spaced blades 22 which are adapted to move through the compartments 16 and 17. The blades 22 are made of flexible material and cooperate in the corresponding compartments of the housing with the lower wall of the housing. The auger 11 in the trough 9 (FIG. 4) is adapted to convey part of the threshed product, such as grain, to the compartment 16 of the housing 14 which is located along one side of the combine harvester. The compartment 17 of the housing 14 communicates by means of an opening with a pipe 23 which extends upwardly and rearwardly from the lower end of the housing 14. The upper end of the pipe 23 communicates with one end of a collecting trough 24, which extends transversely of the longitudinal axis of the combine harvester, and is located near and below the rear end of the rearmost shaker 5. The lower end of the pipe 23 is pivotally mounted on one end of the shaft 20 with a bracket 25 near the middle of the pipe 25. Pipe 23 is mounted on the frame through an eccentric 26. Hence, the pipe 23 together with the trough 24 which is connected to the pipe 23 can be caused to perform a vibrating motion, and the bracket 25 pivots about shaft 20.

Referring to FIG. 3 it will be seen that the housing 14 of the checking device extends to a supervisory station at which the state of the product passing through the housing can be checked. The housing has a transparent inspection hole located near the driver's seat 27, the hole being filled by a transparent window 28 through which the driver of the combine harvester can observe the crop passing through the housing which indicates the quantity of crop which is threshed and not being completely threshed. The forward end of the housing 14 of the checking device is provided on its lower side with an outlet 29 which opens out into the elevator portion 2 through a flexible connecting duct 30.

Having now described the constituent parts of the combine harvester, the operation of same will now be described. The mowing platform cuts and gathers the crop and delivers same to the elevator 2 which in turn feeds the cut crop to the threshing drum 3. The crop is threshed and threshed product falls through the thresher concave 4 onto a conveyor (not shown) which delivers the threshed product, such as grain, into the foremost collecting trough 8 as does some of the product falling through the sieves

6. The threshed product is displaced laterally in the trough 8 by means of the auger 10 which delivers the product to the Jacob's ladder 12 which carries the product upwardly and into the tank 13 arranged on the upper side of the combine harvester. Threshed crop, such as straw, together with some unthreshed crop and only partially threshed crop passes to the vibratory shakers 5.

By means of these shakers 5, threshed product is removed from the straw, which falls on the ground after passing the shakers. The product removed from the straw is guided back to the sieve 6, from which it is brought into the trough 8. The product from trough 8 via auger 10 and Jacob's ladder 12 is delivered to tank 13. Threshed product which is blown from the sieves 6 due to an excessively strong air blast of the fan is collected in trough 9. Unthreshed, partially threshed crop and threshed product which falls from the rear ends of the shakers 5 due to incorrect working of the shakers passes through an opening into the collecting trough 24, and such product then passes down the pipe 23 to the compartment 17 of the housing 14 of the checking device. The auger 11 in the trough 9 conveys the product therein which has been blown from the sieve 6 to the compartment 16 of the housing 14, instead of the compartment 17, which receives the product from the pipe 23. It will be evident that the checking device receives, threshed product and product in different stages of threshing fallen from the rear of the shakers or blown from the sieves 6 and such product is carried by the blades 22 arranged on the endless chain 18 towards the upper end of the housing 14. The driver of the combine harvester will be able to observe the product as it passes beneath the transparent window 28 and the quantity and state of such product will give an indication to the driver as to the efficiency of threshing of crop passing through the combine harvester.

If the quantity of unthreshed product or the quantity of damaged grain deviates from a normal proportion, the driver can immediately make appropriate adjustment to the threshing or cleaning parts of the threshing machines, such as adjustment of the concave relative to the drum. The mixture of products in the housing 14 is conveyed to the upper end of the elevator portion 2 through the outlet 29 and flexible duct 30 so that it can again pass through the machine for further treatment, and the fully threshed products are delivered to tank 13.

Although a threshing machine has been described as forming part of a combine harvester, and is shown provided with a checking device as described herein, it will be evident that such a checking device and threshing machine could be used as a stationary threshing machine in which the efficiency or state of the threshed product can be checked or determined by observation of the product passing through the checking device. With the aid of the checking device, any irregularity in the operation of the machine can be observed and countered.

What I claim is:

1. A combine harvester including a threshing mechanism and a cleaning mechanism for cleaning the threshed crop, said cleaning mechanism having straw shakers extending towards the rear of the harvester and grain dressing sieves positioned beneath said shakers, collecting means being provided in said harvester for collecting part of the thresheld crop, said collecting means being positioned adjacent the rear end of said straw shakers to receive threshed crop from said shakers, an endless conveyor for moving threshed crop from said collecting means forwardly towards an operator's seat, said conveyor having an enclosed housing extending forwardly adjacent said operator's seat on said harvester and observation means in said housing for permitting the visual inspection of the processed crop by the operator.

2. A combine harvester as claimed in claim 1, wherein said observation means for inspecting said threshed crop comprises an observation window located in said housing at the forward end of said housing, adjacent said operator's seat.

3. A combine harvester as claimed in claim 1, wherein said housing is devided into two compartments and said conveyor is movable in both of said compartments.

4. A combine harvester as claimed in claim 3, wherein said conveyor comprises a plurality of blades arranged on a common conveyor chain and said blades are movable in both compartments.

5. A combine harvester as claimed in claim 3, wherein one compartment of said housing communicates with further collecting means positioned beneath said dressing sieves and the other compartment communicates with said first-mentioned collecting means located adjacent the end of said straw shakers.

6. A combine harvester as claimed in claim 5, wherein said first-mentioned collecting means communicates through a pipe with a compartment in said housing.

7. A combine harvester as claimed in claim 6, wherein vibration means is connected to said pipe and said pipe extends downwardly to said housing whereby threshed crop is urged towards said housing by gravity.

8. A combine harvester as claimed in claim 1, wherein said housing is provided with an outlet which leads to said threshing mechanism whereby threshed crop which has passed to the rear of said shakers is moved by said conveyor through said housing to said threshing-mechanism for further processing.

References Cited

UNITED STATES PATENTS

| 3,202,154 | 8/1965 | Viebrock | 130—27.6 |
| 1,791,673 | 2/1931 | Karlson et al. | 130—27 XR |

FOREIGN PATENTS

| 1,308,596 | 10/1962 | France. |

ANTONIO F. GUIDA, Primary Examiner

U.S. Cl. X.R.

116—117